March 12, 1963     N. SHORR     3,081,205

SAFETY GLASS GLAZING UNIT

Filed June 15, 1959     2 Sheets-Sheet 1

INVENTOR.
NORMAN SHORR
BY Oscar L. Spencer
ATTORNEY

March 12, 1963 N. SHORR 3,081,205
SAFETY GLASS GLAZING UNIT
Filed June 15, 1959 2 Sheets-Sheet 2
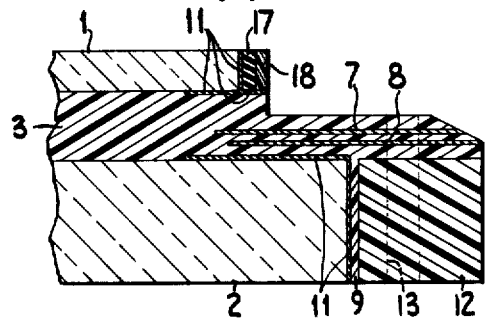
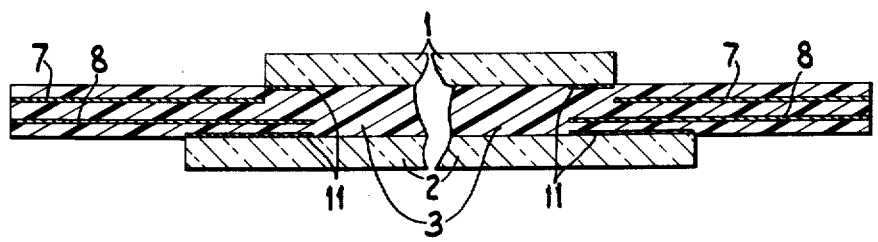
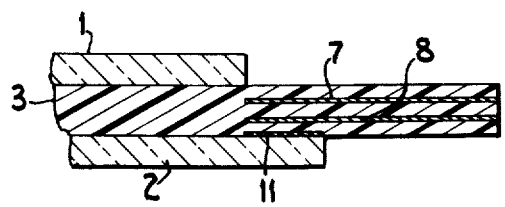
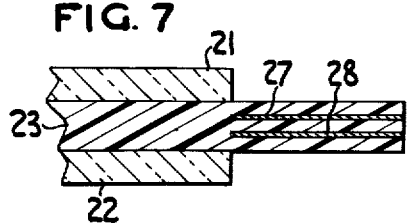
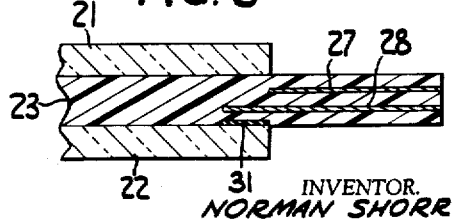
INVENTOR.
NORMAN SHORR
BY Oscar H. Spencer
ATTORNEY

United States Patent Office 3,081,205
Patented Mar. 12, 1963

3,081,205
SAFETY GLASS GLAZING UNIT
Norman Shorr, Mount Lebanon, Pa., assignor to Pittsburgh Plate Glass Company, Allegheny County, Pa., a corporation of Pennsylvania
Filed June 15, 1959, Ser. No. 820,146
20 Claims. (Cl. 154—2.74)

This invention relates to a transparent laminated or safety glass glazing unit or panel which is constructed for flexible mounting in a window opening without clamping the glass sheets of the unit.

Laminated or safety glass glazing units were developed years ago. This type of glazing unit comprised two sheets of glass bonded to a thermoplastic sheet, such as plasticized polyvinyl butyral, interposed between the two glass sheets. For use in a window or windshield in an automobile or for use as a window in a wall of a house or other building, the two glass sheets and the thermoplastic interlayer have the same size so that their edges coincided.

In the flush mounting of the safety glass unit in aircraft, the panel is constructed so that the thermoplastic interlayer extended beyond the two glass sheets and this thermoplastic extension is utilized to mount the unit in an opening in the aircraft body. The extended portion of the thermoplastic sheet is clamped to the supporting structure of the aircraft body. The unit with the extended thermoplastic sheet is described in U.S. Patent No. 2,293,656. The extended portion of the thermoplastic sheet may have the same thickness as the rest of the sheet which is between and bonded to the two glass sheets. The extended portion may be thickened or at least part of it may have a reduced thickness. The two glass sheets may be of the same size or the glass sheets may be of different sizes. In the latter case in which the larger glass sheet is still smaller than the thermoplastic sheet so that it will have part of its margin behind the fuselage or body adjacent the window opening and separated from it by the extended portion of the thermoplastic sheet. The marginal portion of the thermoplastic sheet which is beyond the larger glass sheet is abutted by plates that are secured in position by screws extending through the plates and the margin of the thermoplastic sheet to the fuselage structure. As a result the outer surface or skin of the body of the plane and the outer surface of the outer glass sheet are flush with each other. The manner of mounting of the laminated glazing unit having one glass sheet larger than the other in a window opening in an aircraft is shown in U.S. Patent No. 2,356,878.

To provide greater strength to the extended portion of the thermoplastic sheet of the laminated glazing unit a frame or strips of metal are embedded in and bonded to that extended portion as described in many patents including U.S. Patent No. 2,322,582. The metal strips or frame are disposed centrally of the thickness of the thermoplastic sheet of the laminated glazing unit.

Because the aircraft in which the enclosures are used are capable of and flying at much higher altitudes than heretofore, the glazing units are subjected to much lower temperatures than previously encountered. At the low temperatures the laminated or safety glass units, in which the one glass sheet is larger than the other glass sheet, exhibit a chipping of one of the glass sheets because the thermoplastic sheet contracts upon cooling a substantially greater amount than the glass sheets. This phenomenon is known as "cold chipping." The description of this problem and a solution to it are described in U.S. Patent No. 2,758,042. In that patent a rigid thin frame or set of strips of metal or other material is bonded onto or adjacent the surface of the thermoplastic sheet that is opposite the other surface which is bonded to the larger glass sheet. As pointed out in that patent, this bonding of the rigid frame to the thermoplastic sheet at its extended portion results in the balancing of forces when the thermoplastic interlayer contracts at a greater rate upon cooling than the two glass sheets. The bonding of the rigid frame in this position also provides greater resistance to cold chipping for the construction in which the conventional metal frame is embedded at the central plane of the extension of the thermoplastic sheet extends to a position just inwardly of the periphery of the smaller glass sheet. However, this construction for a laminated or safety glass glazing unit does not provide adequate protection against cold chipping when the glazing unit is mounted and subjected to very low temperatures while providing a pressure differential on the unit with the higher pressure being applied against the larger glass sheet.

The pressure differential occurs when the plane is in flight. It occurs because the larger glass sheet has its outside surface inside the plane and the outside surface of the smaller glass sheet is in contact with the atmosphere. In pressurized aircraft the pressure inside the cabin is considerably greater than the pressure of the air at the operating altitude of the plane. This difference in pressure may be as high as 10 pounds per square inch or greater.

A number of aircraft laminated glazing units have an electroconductive coating or film applied to the inside surface of the outside glass sheet to heat the latter by electric current that is fed to the film by bus bars adhered to and along two margins of the inside face of the outer glass sheet. This heating of the glass prevents the ice formation on the windshield or window unit. However, because of the heating of the unit by the electroconductive film while the unit is being subjected to very low temperatures because of the altitude of flight and is being subjected to the pressure differential mentioned above, the unit is subjected to many additional stresses. As a result there is chipping of the inner glass sheet or the outer glass sheet or both.

It is an object of the present invention to provide a laminated glazing unit for use at very low temperatures and at a substantial difference in pressure between the opposite sides of the glazing unit whereby the thermoplastic extension of the safety glass construction will counteract the pressure differential to maintain the unit in place and avoid the creation of the forces or stresses that would result otherwise in cold chipping of the glass under these conditions, e.g., during flight of aircraft at high altitudes, especially when the cabin is pressurized.

This and other objects of the invention will be apparent to one skilled in the art from the description which follows and from the drawings in which similar parts are generally designated by the same number and in which:

FIG. 4 is a cross section of a modification of the embodiment of the laminated glazing unit shown in FIGS. 1–3 and is taken along a line of FIG. 1 corresponding to FIG. 3;

FIG. 5 is a cross section of another embodiment of the laminated glazing unit of the invention;

FIG. 6 is a cross section of still another embodiment of the glazing unit of the invention; and FIGS. 7 and 8 are cross sections of further embodiments of the glazing unit of the invention in which the two glass sheets have the same dimensions so that their edges are in coincidence.

Figure 1:
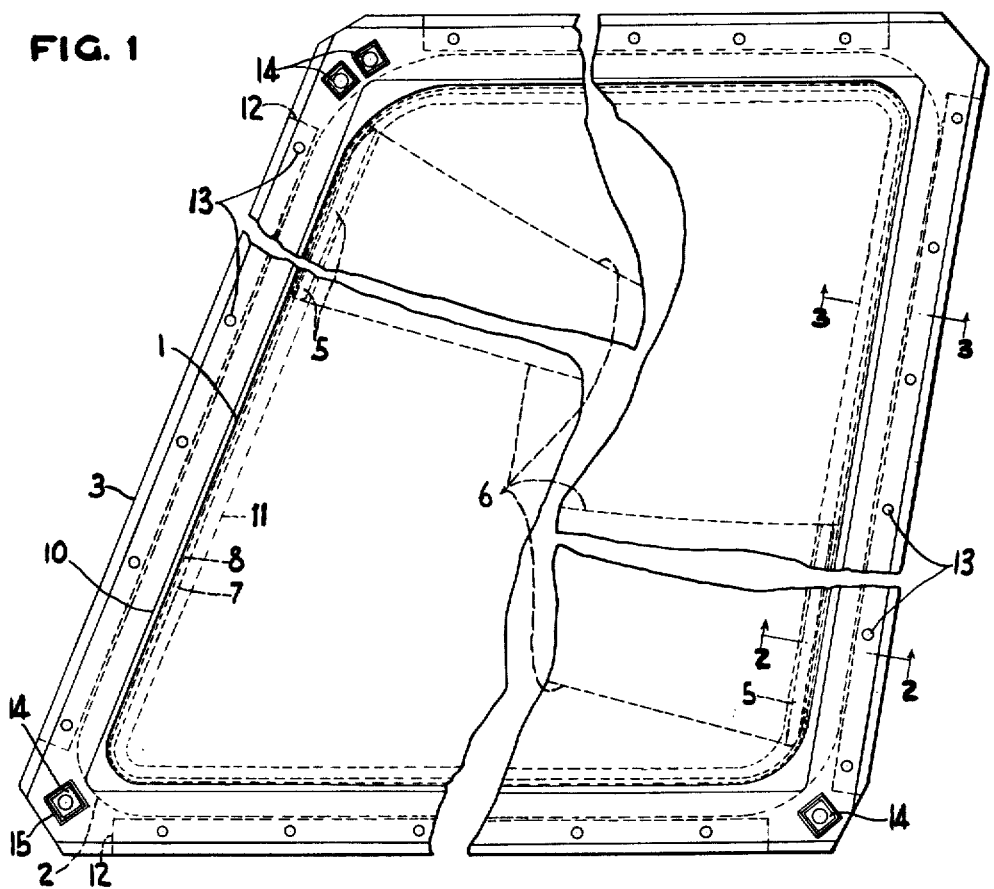
FIG. 1 is a plan of one embodiment of the laminated glazing unit of the present invention.

The transparent laminated glazing panel of the present invention comprises two glass sheets bonded to a thermoplastic sheet interposed between them. The thermoplastic sheet extends beyond both of the glass sheets which may be of the same size or of different sizes. The laminated glazing panel or unit further includes a pair of spaced frames of a material, having a relatively low coefficient of thermal expansion and a high modulus of elasticity, embedded in and bonded to the thermoplastic sheet. The frames are embedded in the portion of the thermoplastic sheet that extends outwardly of the peripheral edge of each of the two glass sheets. The outer edges of each frame are preferably coincident with the peripheral edge of the thermoplastic sheet.

The frames are on opposite sides of and spaced from a plane of the thermoplastic sheet in which the plane is equidistant from the surfaces of that portion of the thermoplastic sheet having a minimum thickness in an area of the sheet extending outwardly from the peripheral edge of one of the glass sheets to an outer boundary which is a maximum of about ½ inch, preferably a maximum of about ¼ inch, outwardly of the peripheral edge of the other glass sheet. Of course, where the thermoplastic sheet has a uniform thickness throughout its length and width, except perhaps for peripheral chamfering, the central plane of the sheet is the plane referred to above and the frames are embedded in and bonded to the theremoplastic sheet on opposite sides and spaced from the central plane.

The frames extend inwardly of the glazing unit in the theremoplastic sheet so that the inner edges are no more than about ¼ inch, preferably no more than about ⅛ inch, outwardly of the peripheral edge of either glass sheet. In the case of the glazing unit in which one glass sheet is larger than the other the frames extend inwardly so that their inner margins oppose the margin of the larger glass sheet and their inner edges are no more than about ¼ inch, preferably no more than about ⅛ inch, outwardly of the peripheral edge of the smaller glass sheet. In the case of the glazing unit in which the glass sheets are of the same size and in which the peripheral edges of the two glass sheets are in coincidence the frames extend inwardly of the unit so that their inner edges are no more than about ¼ inch, preferably ⅛ inch, outwardly of the peripheral edges of the two glass sheets.

Preferably the inner edges of the frames are inwardly at least in coincidence with the peripheral edges of the two glass sheets of the same size or in coincidence with the peripheral edge of the smaller glass sheet in the unit in which the glass sheets have different sizes. For maximum protection against cold chipping at least one of the frames extends inwardly so that its inner margin is inwardly of the peripheral edge of each of the two glass sheets whether or not the glass sheets have the same or different sizes. Of course, one of the frames can have its inner edges outwardly of the peripheral edge of one of the glass sheets when the other frame has its inner edges in coincidence with or inwardly of the peripheral edge of that glass sheet which is the smaller glass sheet in the case of the unit having glass sheets of different sizes.

The laminated glazing unit of this invention can have a parting material between the margins of one or both of the glass sheets and the area of the thermoplastic sheet opposing those margins. The parting material when present enhances the degree of protection against cold chipping provided by the pair of spaced frames of the present invention. The parting material as a thin coating, layer or sheet may be one that does not bond to the thermoplastic sheet or to the glass sheet, but the preferred material bonds both to glass and to the thermoplastic material. In the latter case the parting material is one that is elastic at low temperatures so that upon the contraction of the glass and thermoplastic sheet at substantially different rates there can be relative movement of the thermoplastic sheet with respect to the margin of the glass sheet or glass sheets without creating stresses in the glass sheet. This occurs because the parting material will be easily distorted internally as its surface bonded to the thermoplastic sheet is moved at a greater rate than the surface bonded to the glass sheet. Such parting materials are well known in this art.

The glazing unit of the invention can have an electroconductive coating adhered to the inside surface of one of the glass sheets which is usually the glass sheet that has its other surface exposed to the atmosphere. Electrically conducting strips adhered to the electroconductive coating or film or to the inner surface of the glass sheet mentioned above are well known in the art. These strips serve as bus bars for feeding a current to the electroconductive film. The compositions used for the preparation of the bus bars and for the electroconductive film and their application to the glass sheet are described in numerous patents, e.g., U.S. Patents Nos. 2,592,601 and 2,614,944.

The thermoplastic sheet of the laminated glazing unit of the invention can be made from a number of different materials, as is well known in the art, such as plasticized polyvinyl butyral and silicone. These materials have coefficients of expansion that are relatively high as compared with glass which has a relatively low coefficient of expansion. The coefficients of expansion of plate glass and plasticized polyvinyl butyral are about $5 \times 10^{-6}$ and $50 \times 10^{-6}$ inch per inch per degree Fahrenheit, respectively. The thickness of the thermoplastic sheet can be between about 0.05 and about 0.5 inch, preferably between about 0.2 and about 0.4 inch.

In the case where the plasticized polyvinyl butyral is used as the material for the thermoplastic sheet the amount of plasticizer can vary a fair amount. Various plasticizers are well known in the art. An example of the plasticizer is triethylene glycol ester of 2-ethyl hexanoic acid and the preferable amount of this plasticizer is about 21 parts by weight per 100 parts by weight of polyvinyl butyral resin.

The material of the spaced frames has a relatively low coefficient of expansion, i.e., the coefficient of expansion is preferably no more than about three times the coefficient of glass. The material of the spaced frames must be one that has a high modulus of elasticity and has a fairly high tensile strength. Examples of the material are metals such as aluminum, titanium and steel and epoxy impregnated fiber glass. The metals are the preferred material of the spaced frames and steel and titanium are preferable to aluminum. The thickness of each of the spaced frames is dependent upon the physical properties of the materials used for the frame. The thickness of each of the frames should be at least 0.005 inch. The maximum thickness is limited by the thickness of thermoplastic sheet between the glass sheets. The weight of the panel must be considered when determining the thickness of the frames. Generally the thickness of each frame will be between 0.010 and 0.040 inch. The thicker plastic sheet requires thicker frames to prevent chipping at the same low temperature and pressure differential.

Figure 2:
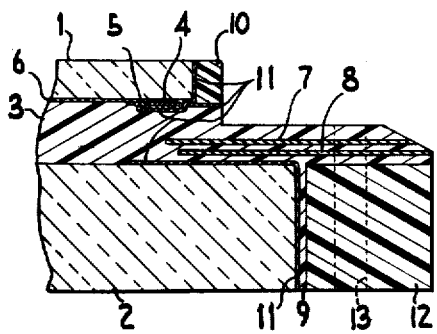
FIG. 2 is a cross section of the unit taken along the line 2—2 of FIG. 1.
Figure 3:
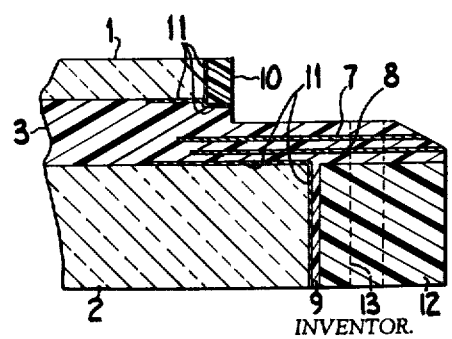
FIG. 3 is a cross section of the unit taken along the line 3—3 of FIG. 1.

The embodiment of the laminated glazing unit of the present invention shown in FIGS. 1–3 has a glass sheet 1 and a larger glass sheet 2. The glass sheets 1 and 2 are bonded to a thermoplastic sheet 3 between them. The glass sheet 1 has on its surface opposing thermoplastic sheet 3 two strips 4 of electroconductive material adhered along the opposite margins of glass sheet 1. The strips 4 are first applied to sheet 1 in the manufacture of this illustrative unit. A pair of electrically conducting strips or bus bars 5 are adhered on strips 4. The bus bars 5 are applied in the next step of the manufacturing process. These bus bars 5 are spaced slightly inwardly of the edges of the glass sheet 1. A film 6 of electroconductive material is adhered on glass sheet 1 on this surface opposing thermoplastic sheet 3. The film 6 which is applied to sheet 1 after the application of bus bars 5 extends over bus bars 5 and is in electrical contact with bus bars 5 and strips 4. The electroconductive strips 4 and electroconductive films 6 are tightly adherent to glass sheet 1 and bus bars 5 so that the bonding of thermoplastic sheet 3 to film 6 provides the bonding or adhering of sheet 3 to sheet 1. The thermoplastic sheet 3 extends beyond larger glass sheet 2.

A metal frame 7 and a metal frame 8 are embedded in and bonded to sheet 3 in its extension beyond sheet 2. The metal frames 7 and 8 extend inwardly, in this illustrative embodiment, of the peripheral edge of glass sheet 1. Frame 7 extends farther inwardly than does frame 8. The glazing unit has a thermoplastic strip 9 extending around the periphery or edges of glass sheet 2. The peripheral strip 9 is bonded to thermoplastic sheet 3 in the laminating process to make the unit so that it is integral with it. Similarly, a strip 10 of thermoplastic material extends around the periphery or edges of glass sheet 1 but it is separated from thermoplastic sheet 3 by a layer or coating 11 of a parting material between strip 10 and sheet 1 and between strip 10 and thermoplastic sheet 3. The layer 11 is bonded to sheets 1 and 3 and to strip 10. In addition, the layer 11 of parting material extends inwardly on the surface of sheet 3 to separate the two margins of electroconductive film 6 from sheet 3. These margins of film 6 include the portion over and slightly inwardly of bus bars 5. The layer 11 of parting material also separates strip 9 and glass sheet 2. This layer 11 of parting material continues from the edge of sheet 2 around to the marginal surface of sheet 2 opposing thermoplastic sheet 3. The inward extension of this layer 11 of parting material is coincident with the inward extension layer 11 of parting material separating the marginal portion of film 6 and thermoplastic sheet 3.

The unit of this embodiment has four strips 12 of rigid resin, such as Synthane or other penol formaldehyde resin, adhere to strips 9 and to one surface of the extended portion of thermoplastic sheet 3. Each of the strips 12 is along the margin adjacent an edge of sheet 3. Holes 13 are drilled through the extension of sheet 3, through frames 7 and 8 and through resin strips 12 for the insertion of bolts to mount the unit to the supporting structure of an airplane at a window opening.

The unit of FIGS. 1–3 has a number of terminal blocks 14 mounted through sheet 3 and frames 7 and 8. One of blocks 14 is mounted in each of the two bottom corners of the unit as seen in FIG. 1. In the upper righthand corner there is none whereas in the upper lefthand corner there are two blocks 14. The terminal blocks 14 are made of an electrical conducting material and each has a centrally threaded blind opening into which a screw (not shown) is mounted for connecting an electrical wire from an electric power source. The terminal block 14 is surrounded by the thermoplastic material which spaces from block 14 a rectangular electrical insulator sleeve 15, such as phenol formaldehyde resin sleeve, which has its outer surface abutting frames 7 and 8 through which sleeve 15 extends. Beyond the ends of strips 12 the corners of the unit outwardly of glass sheet 2 are built up with thermoplastic material to provide the entire margin of the unit with the same thickness. Of course, this thermoplastic material is integral with strips 2 and sheet 3 as a result of the laminating process to make the unit.

A flat metal braid is soldered to each terminal block 14 at the side opposite the hole in it. The braid extends from block 14 in the lower left corner of FIG. 1 between sheets 1 and sheet 3 to make electrical contact with bus bar 5 at the lefthand side of FIG. 1. Similarly a flat metal conductor braid (not shown) extends from block 14 at the lower righthand side of FIG. 1 between sheets 1 and 3 to make electrical contact with the other bus bar 5. A flat metal braid (not shown) is electrically connected to each of terminal blocks 14 in the upper lefthand corner of the unit as seen in FIG. 1, and this pair of metal braids is connected to a temperature sensing device (not shown) of the conventional type that is mounted between film 6 and thermoplastic sheet 3.

The strip 10 is conventional bumper strip that is in position to prevent contact between the supporting structure of the fuselage of the plane and the edge of glass sheet 1. The strips 12 provide some rigidity to the margin of the unit that is mounted by bolts (not shown) through holes 13. The strips 9 prevent contact between strips 12 and the edges of glass sheet 2 and thus protect the edges of the latter.

Instead of the single bumper strip 10 utilized in the construction of FIGS. 1–3 an optional construction for this type of unit is shown in FIG. 4. A bumper strip 17 of rubber or the like is positioned around the periphery of glass sheet 1 and is separated from sheet 3 by the layer 11 of parting material. The layer 11 is bonded to sheets 1 and 3 and to strip 17. A strip 18 of thermoplastic material extends around the periphery of strip 17 and is bonded to it but is separated from sheet 3 by the layer 11 of parting material which is bonded to sheet 3 and strip 18. The combined thickness of strips 17 and 18 are equal to the thickness of strip 10 so that the dimensions of the glass unit remain the same as those of the unit shown in FIGS. 1–3.

In the units of FIGS. 1–3 and FIG. 4 sheet 3 in its extension beyond sheet 1 and opposing strip 10 or strips 17 and 18 has a slightly smaller thickness than that part opposing sheet 1. The thickness of the sheet outwardly of strip 10 or strips 17 and 18 is substantially smaller. The edges of sheet 3 are chamfered. The particular configuration of the extension portion of the thermoplastic sheet 3, the use of strips 9, 10 and 12 and the chamfering of the edges of sheet 3 are not limiting factors in this invention but are merely in an illustrative embodiment of the laminated glazing unit of this invention. Similarly the use of electroconductive film 6 and the bus bars 5 are merely components of the particular illustrative construction and are not necessary components of the glazing unit of the invention although their presence adds to the likelihood of cold chipping that is overcome by the construction of the glazing unit of this invention.

In the embodiment of the glazing unit of the present invention shown in FIG. 5 glass sheet 1 and larger glass sheet 2 are bonded to thermoplastic sheet 3 interposed between and extending beyond them. The metal frames 7 and 8 are embedded in and bonded to thermoplastic sheet 3. The frames 7 and 8 extend inwardly from the periphery of sheet 3. The frames 7 and 8 are on opposite sides of and spaced from the central plane of thermoplastic sheet 3 which has a uniform thickness throughout its length and breadth. The inner edges of frame 7 are in coincidence with the peripheral edge of sheet 1 whereas the inner edges of frame 8 extend inwardly of the peripheral edge of sheet 1 for a small distance and thus, of course, extend inwardly of the peripheral edge of sheet 2. Layers 11 of parting material are bonded to the marginal surfaces of glass sheets 1 and 2 and bonded to sheet 3. In this illustrative embodiment the inner edges of layers 11 on sheets 1 and 2 are in coincidence with each other and with the inner edges of frame 8.

In the embodiment of the glazing unit shown in FIG. 6 glass sheet 1 is smaller than glass sheet 2 and extending beyond both of them is thermoplastic sheet 3 which is interposed between and bonded to them. The frames 7 and 8 extend inwardly from the periphery of sheet 3. Their inner edges are in coincidence with the peripheral edge of sheet 1. As in the embodiment of FIG. 5 sheet 3 has a uniform thickness throughout its length and breadth. The frames 7 and 8 are bonded to sheet 3 and are on opposite sides of and spaced from the central plane of sheet 3. The layer 11 of parting material is between and bonded only to sheet 3 and the entire marginal area of the sheet 2.

The inner edges of layer 11 are in coincidence with the peripheral edge of sheet 1. There is no layer 11 of parting material bonded to the marginal inner surface of sheet 1 although there could be.

In the embodiments of the glazing unit of the invention shown in FIGS. 7 and 8 there are two glass sheets 21 and 22 of the same size with the peripheral edges in coincidence. A thermoplastic sheet 23 of uniform thickness throughout its length and breadth is interposed between and bonded to sheets 21 and 22 and extends beyond their peripheries. In both constructions there are a metal frame 27 and a metal frame 28 on opposite sides of and spaced from the central plane of sheet 23. The frames 27 and 28 are embedded in and bonded to sheet 23. The inner edges of frames 27 and 28 in the glazing unit of FIG. 7 are in substantial coincidence with the peripheries of sheets 21 and 22. In the glazing unit of FIG. 8 frame 27 has its inner edges in substantial coincidence with the peripheries of sheets 21 and 22 but frame 28 extends farther inwardly so that its inner margin is between sheets 21 and 22 and their peripheral margins. A layer 31 of parting material is adhered to marginal inside surface and to sheet 23. The layer 31 opposes the inner margin of frame 28.

In the embodiments of FIGS. 1-3 and FIG. 4, the frames 7 and 8 extend both inwardly and outwardly of a plane intersecting the marginal edge surface of each glass sheet of the unit. In all of the units except those of FIGS. 7 and 8, both frames 7 and 8 extend both inwardly and outwardly of a plane intersecting the marginal edge surface of at least one of the glass sheets of the unit.

In the glazing unit of the present invention the frames which have been referred to can be replaced by strips of the material along each margin and these strips preferably have sufficient length so that the edges at each end of the strip abuts or almost abuts the edges of strips along adjacent margins. The frames or substitute strips are positioned in the thermoplastic sheet so that each is at least about 0.020 inch from the closer surface of the thermoplastic sheet in the area of the sheet which is opposed by a glass sheet or which is no more than about ½ inch, preferably no more than about ¼ inch, beyond the periphery of the glass sheet. It is found desirable to space the frames as far apart from each other on opposite sides of the plane of the thermoplastic sheet, as defined above. Thus, it is preferable that the frames be no more than about 0.1 inch from the closer surface of the thermoplastic sheet. The position of the frame is preferably between about 0.030 and about 0.050 inch from the closer surface of the thermoplastic sheet.

In the glazing unit of this invention both of the glass sheets can be annealed, semi-tempered or tempered. It is preferred that the glass sheet, which is to be inboard when mounted in the plane, be tempered. The tempered sheet will provide greater strength to the construction which is needed when the cabin is pressurized and the plane is a high altitude. In the case of the glazing panel having two glass sheets of different sizes, the larger glass sheet is inboard when the panel is mounted.

A method for assembling the components and bonding them to one another is described briefly below with reference to the glazing panel as shown in FIG. 4. The ½-inch tempered glass sheet and a smaller ³⁄₁₆-inch glass sheet having an electroconductive coating and a pair of bus bars bonded on one of its surfaces were used. A total of twelve Vinal (plasticized polyvinyl butyral) sheets, six of which were about 31" x 35", containing about 21 parts by weight of the plasticizer per 100 parts by weight of the polyvinyl butyral resin were placed between the glass sheets in the following manner. All but two of these twelve Vinal sheets were 0.020 inch in thickness. The other two sheets were 0.025 inch in thickness.

Two Vinal sheets about 31" x 35" were placed on the ½-inch glass sheet in a jig fixture. Each of these Vinal sheets extended beyond the periphery of the glass sheet slightly more than ½ inch. A frame of AISI 301 (¼ hard) stainless steel having a thickness of 0.020 inch was placed on the assembly. Its outer dimensions coincided with that of the Vinal sheets and its inner dimensions were such that it extended inwardly of the periphery of the ½-inch glass sheet about ½ inch. One of the Vinal sheets was also placed on the assembly to be just inside the area defined by the steel frame. The two 0.025-inch sheets of Vinal of the same other dimensions as the first two Vinal sheets were placed on top. A stainless steel (AISI 301, ¼ hard) frame having a thickness of 0.020 inch and having the outer dimensions of the first stainless steel frame was placed on this assembly. The inner edges of the second frame extend inwardly of the first steel frame about 0.05 inch and a Vinal sheet was also placed on the last Vinal sheet between the second frame so that its periphery substantially abutted the inner edges of the steel frame. Two sheets of Vinal having the same dimensions as the first two sheets were placed on this assembly. Four Vinal sheets were placed on this assembly. These four sheets had dimensions such that their peripheries were inwardly of the periphery of the ½-inch glass sheet about ½ inch. The ³⁄₁₆-inch glass sheet was placed on the assembly with the electroconductive coating and bus bars facing the Vinal sheets. The conductor braid connected to the bus bars was separated from the Vinal by a thin insulator strip. The ³⁄₁₆-inch sheet had the layer of parting material covering its margin and edge as described above as did the margin and edge of the ½-inch glass sheet. The thickness of the layer of parting material is only a few thousandths of an inch. The rubber strip and Vinal strip of the same dimensions were placed around the ³⁄₁₆-inch glass sheet. These strips serve as a compound bumper for the edge of the ³⁄₁₆-inch glass sheet. The compound bumper extended about 0.120 inch from the edge of the ³⁄₁₆-inch sheet. The compound bumper was taped in position. The inner edges of the first and second frames were 0.05 and 0.1 inch, respectively, of the peripheral edge of the ³⁄₁₆-inch glass sheet. The top four Vinal sheets had the peripheries coincident with the surface of the 0.060-inch Vinal strip opposite the surface opposing the rubber strip.

The phenol-formaldehyde strips corresponding to strips 12 were positioned after inverting the fixture and the assembly. Vinal was placed between the ends of strips 12 and the fixture and between the ½-inch glass sheet at its corners and the fixture.

The assembly was built up with cardboard above the Vinal sheets that extend the full dimensions of the glazing panel. This was done in the customary manner. The glazing panel was placed in a plastic bag which was then evacuated for removal of air from between the various sheets of materials. The evacuated bag was sealed and then placed in oil for a conventional temperature and pressure treatment for the time necessary to bond components of glazing panels of this general type. After this heat and pressure treatment the unit was removed from the bag and separated from the temporary build-up material. The edges of the Vinal extension were chamfered.

This unit has been cooled to a temperature of −65° F. and subjected to a pressure differential of 18.6 p.s.i. gauge with the greater pressure being applied against the ½-inch glass sheet. The unit satisfactorily passed this test for resistance to cold chipping at low temperatures and pressure differential.

A number of samples of laminated glazing panels were made in accordance with the type shown in FIG. 5. No parting material was present. The top and bottom glass sheets each ¼ inch in thickness and the thermoplastic Vinal interlayer 0.410 inch in thickness were 6 inches long. The top glass sheet was 5 inches wide. The bottom sheet was 6 inches wide. The Vinal was 8 inches wide. AISI 302 stainless steel strips, each having a thickness of 0.025 inch, were inserted between layers of a Vinal interlayer along each of the two margins that extend beyond the two glass sheets. The inner edges of these strips were positioned similarly to the construction shown in FIG. 5. Two sets of strips were used instead of two frames because the two glass sheets and the Vinal had the same length. In addition to two glass panels of this type, other sets of two glazing panels were prepared using in each panel two sets of strips of 0.030-inch epoxy-impregnated fiber glass cloth in lieu of the steel strips. In other panels strips of 0.030-inch 24S–T aluminum or 0.032-inch Ti–140A titanium were used instead of the steel strips embedded in each marginal extension of the Vinal interlayer. In all cases the strips were on opposite sides of the central plane of the 0.410-inch Vinal interlayer and spaced ⅛ inch from each other. Comparative samples were made using a single strip of the materials within each of the two marginal portions of Vinal of the panel and these were disposed along the central plane of the Vinal interlayer. All of these panels were treated in a conventional way for bonding their components to one another.

The laminated panels were placed in a cold box and subjected to progressively colder temperatures. At −30° F. there was chipping in different amounts of the panels containing only one of the strips along each margin of the Vinal at its central plane when the strips were the impregnated fiber glass cloth, aluminum and steel strips whereas the single titanium strip at each margin prevented chipping at −30° F. but chipping occurred in these panels at −60° F. The panels with the single stainless steel strip at each margin chipped less than when using aluminum. The latter chipped less than when using fiber glass cloth.

With respect to the set of two strips at each margin the panels using fiber glass strips had no chipping at −30° F. but chipped at −60° F. The panels with the double aluminum strips in each margin were satisfactory at −30° F. but chipped at −60° F. Those with the double stainless steel and titanium strips in each marginal extension of Vinal exhibited no chipping at −60° F. but those with the steel inserts chipped at −80° F. One of the panels with the double titanium strips was satisfactory at −80° F. but chipped at −100° F.

Two laminated glazing panels were prepared using for each a 14¾″ x 10¾″ x ¼″ glass sheet, a 16″ x 12″ x ¼″ tempered glass sheet and 20 plies of Vinal sheet each 0.025 inch in thickness. All of the sheets of Vinal, except two, were 18¾″ x 14¾″. The other two Vinal sheets had dimensions to fit inside the stainless steel frames which were 0.025 inch in thickness. The frames were spaced 0.250 inch apart equidistant from the center line of the Vinal. The frames inner dimensions such that in some cases the glazing panel was like FIG. 5 and in other cases the position of the inner edges of the metal frames was like FIG. 6. In the panel like FIG. 5 the parting material extended inwardly one inch from the edge of sheet 2 and inwardly ⅜ inch of the peripheral edge of sheet 1. In the panel like FIG. 6 the parting material had a width of ⅝ inch. These two glazing panels were placed in a cold box at −100° F. as a part of a wall in a box within the cold box. The sheet 1 of each panel had its outside surface exposed to the air in the cold box and sheet 2 was exposed to the air of the box within the cold box. In the case of the panel similar to FIG. 6 11 p.s.i. gauge air pressure was applied within the box inside the cold box when the temperature of the outside glass sheet was −75° F. and the temperature of the inside glass sheet was −20° F. This pressure was alternately applied and released in a three-second cycle. This cycle was conducted for a thousand times and the sample showed no evidence of failure due to chipping. The sample having a construction like FIG. 5 was similarly treated and satisfactorily resisted cold chipping.

The panel constructed like that shown in FIG. 6 was treated and satisfactorily resisted cold chipping. about −100° F. When the top plate had reached −84° F. and the larger or inside plate had reached −56° F. the cycle of pressure on and off was begun. After 700 cycles using a pressure of 20 p.s.i. gauge the pressure was changed to 30 p.s.i. gauge until a total of 1000 cycles had been completed. The glazing panel had no cold chipping.

In the foregoing description the article of the invention is illustrated by various embodiments and examples in which the laminated glazing unit has only two glass sheets and a thermoplastic sheet bonded between them. However, the glazing unit of the present invention includes panels in which this construction is present in addition to at least one other sheet of material, glass or plastic, bonded, for example, to one of the two glass sheets mentioned above by a thermoplastic sheet. In addition various other modifications will be apparent to one skilled in the art from the foregoing description. The embodiments and examples are merely illustrative and the invention is limited only by the claims which follow.

I claim:

1. A laminated glass panel comprising first and second glass sheets, a thermoplastic sheet having a relatively high coefficient of thermal expansion compared to that of glass interposed between and bonded to said first and second glass sheets, said thermoplastic sheet having a marginal portion extending outwardly from the peripheral edge of the first glass sheet and beyond the peripheral edge of the second glass sheet, and a pair of spaced frames of a material having a relatively low coefficient of thermal expansion compared to that of the thermoplastic sheet and a relatively high modulus of elasticity embedded in and bonded to the thermoplastic sheet, said frames being in at least a part of the marginal portion of the thermoplastic sheet and being on opposite sides of and spaced from a plane of the thermoplastic sheet, said plane being equidistant from the surfaces of a part of said marginal portion of the thermoplastic sheet having a minimum thickness in an area of the thermoplastic sheet extending outwardly from the peripheral edge of said first glass sheet to an outer boundary of said part and said boundary being ½ inch outwardly of the peripheral edge of said second glass sheet.

2. The panel of claim 1 wherein the pair of spaced frames is made of metal.

3. The panel of claim 2 wherein the metal of the pair of spaced frames is stainless steel.

4. The panel of claim 2 wherein the metal of the pair of frames is titanium.

5. The panel of claim 2 wherein the metal of the pair of frames is aluminum.

6. The panel of claim 1 wherein the first and second glass sheets have different sizes.

7. The panel of claim 6 wherein the pair of frames is made of metal.

8. The panel of claim 7 wherein the metal of the pair of frames is stainless steel.

9. The panel of claim 7 wherein the pair of spaced frames are made of titanium.

10. The panel of claim 7 wherein each of the pair of frames is spaced from the closer surface of the thermoplastic sheet by a distance of at least about 0.020 inch and not exceeding about 0.1 inch.

11. The panel of claim 10 wherein the spacing of each of the frames is from the closer surface of the thermoplastic sheet by a distance between about 0.030 and 0.050 inch.

12. The panel of claim 1 wherein the first and second glass sheets have different sizes, wherein at least one of the pair of frames extends inwardly of the peripheral edge of both glass sheets and wherein the pair of frames is made of metal.

13. The panel of claim 12 wherein the thickness of each frame is between about 0.01 and about 0.04 inch and wherein the metal is stainless steel.

14. A laminated panel comprising a pair of glass sheets and a thermoplastic interlayer having a relatively high coefficient of thermal expansion compared to that of glass interposed between said glass sheets, said interlayer extending beyond the marginal edge of one of said glass sheets and having one frame therein extending substantially parallel to the plane of the surface facing one of said glass sheets, said frame extending both inwardly and outwardly of a plane intersecting the marginal edge surface of said one of said glass sheets and being spaced between about 0.020 inch and about 0.1 inch from the adjacent surface of said interlayer, said interlayer having another frame therein extending in a plane parallel to the plane occupied by said frame and located on the other side of the center plane of said interlayer and spaced between about 0.020 inch and about 0.1 inch from the other surface of the interlayer adjacent thereto, said frames being composed of a material having a relatively low coefficient of thermal expansion compared to that of said thermoplastic interlayer and a relatively high modulus of elasticity.

15. A laminated panel as in claim 14, wherein the frames are made of metal.

16. A laminated panel as in claim 15, wherein said metal is titanium.

17. A laminated panel as in claim 15, wherein said metal is stainless steel.

18. A laminated panel as in claim 15, wherein said metal is aluminum.

19. A laminated panel as in claim 14, wherein each of said frames extends both inwardly and outwardly of the planes intersecting the marginal edge surface of the glass sheet adjacent each side of the interlayer containing said frames.

20. A laminated panel comprising a pair of glass sheets and a thermoplastic interlayer interposed between said glass sheets, said interlayer extending beyond the marginal edge of at least one of said glass sheets, a pair of frames of a material different from said interlayer and said glass sheets located within said interlayer on opposite sides of the center plane thereof and extending substantially parallel to the plane of the surface facing each of said glass sheets, each frame being spaced between about 0.020 and 0.1 inch from the surface of said interlayer adjacent thereto, at least one of said frames extending both inwardly and outwardly of a plane intersecting the marginal edge surface of one of said glass sheets.

References Cited in the file of this patent

UNITED STATES PATENTS

| | | |
|---|---|---|
| 2,758,042 | Raymond et al. | Aug. 7, 1956 |
| 2,991,207 | Millar | July 4, 1961 |

UNITED STATES PATENT OFFICE
CERTIFICATE OF CORRECTION

Patent No. 3,081,205 March 12, 1963

Norman Shorr

It is hereby certified that error appears in the above numbered patent requiring correction and that the said Letters Patent should read as corrected below.

Column 5, line 39, for "penol" read -- phenol --; line 70, for "sheets 1" read -- sheet 1 --; column 9, line 74, for "treated and satisfactorily resisted cold chipping." read -- treated at high pressures in the cold box maintained at --.

Signed and sealed this 18th day of August 1964.

(SEAL)
Attest:

ERNEST W. SWIDER
Attesting Officer

EDWARD J. BRENNER
Commissioner of Patents